United States Patent
McCutchen et al.

(10) Patent No.: US 8,386,115 B2
(45) Date of Patent: Feb. 26, 2013

(54) VEHICLE EMAIL NOTIFICATION USING TEMPLATES

(75) Inventors: Shane McCutchen, Howell, MI (US); Mark D. Graham, Hamtramck, MI (US)

(73) Assignee: General Motors LLC, Detroit, MI (US)

(*) Notice: Subject to any disclaimer, the term of this patent is extended or adjusted under 35 U.S.C. 154(b) by 1378 days.

(21) Appl. No.: 11/618,210

(22) Filed: Dec. 29, 2006

(65) Prior Publication Data

US 2007/0179706 A1    Aug. 2, 2007

Related U.S. Application Data

(60) Provisional application No. 60/755,329, filed on Dec. 31, 2005.

(51) Int. Cl.
*G01M 17/00* (2006.01)
*G06F 17/00* (2006.01)
*G07C 5/00* (2006.01)

(52) U.S. Cl. ............ 701/29.1; 701/29.4; 701/31.5; 340/438

(58) Field of Classification Search ........... 701/29–33, 701/35–36, 99, 114–115, 1; 340/425.5, 438, 340/439, 500
See application file for complete search history.

(56) References Cited

U.S. PATENT DOCUMENTS

| | | | |
|---|---|---|---|
| 6,490,444 B1 * | 12/2002 | Bossemeyer et al. | 455/412.2 |
| 6,496,568 B1 * | 12/2002 | Nelson | 379/88.12 |
| 6,643,355 B1 * | 11/2003 | Tsumpes | 379/45 |
| 6,681,110 B1 | 1/2004 | Crookham et al. | |
| 6,708,038 B1 | 3/2004 | Laguer-Diaz et al. | |
| 2002/0103583 A1 | 8/2002 | Ohmura et al. | |
| 2004/0128067 A1 * | 7/2004 | Smith | 701/207 |
| 2004/0198386 A1 | 10/2004 | Dupray | |
| 2004/0204805 A1 | 10/2004 | Betters et al. | |
| 2004/0249557 A1 | 12/2004 | Harrington et al. | |
| 2005/0080606 A1 | 4/2005 | Ampunan et al. | |
| 2005/0086310 A1 | 4/2005 | Kamdar et al. | |
| 2005/0096020 A1 | 5/2005 | Oesterling et al. | |
| 2005/0187680 A1 | 8/2005 | Kamdar et al. | |
| 2005/0288830 A1 | 12/2005 | Reeser et al. | |
| 2006/0030298 A1 | 2/2006 | Burton et al. | |
| 2006/0085153 A1 | 4/2006 | Oesterling et al. | |

(Continued)

FOREIGN PATENT DOCUMENTS

DE    10393476 T5    8/2005

OTHER PUBLICATIONS

German Office Action for German Patent Application No. 11 2006 003 591.6 dated Nov. 16, 2009, 2 pages.
Chinese Office Action for China Patent Application No. 2006800534233, 13 pages.

*Primary Examiner* — Thomas Tarcza
*Assistant Examiner* — Edward Pipala
(74) *Attorney, Agent, or Firm* — Anthony Luke Simon; Reising Ethington P.C.

(57) ABSTRACT

A vehicle email notification system and method in which templates are used to automatically generate email messages that provide the recipient with diverse types of dynamic vehicle information. The email notifications are triggered by different events, some of which are independent of the vehicle (e.g., a monthly trigger), and others of which occur at the vehicle, such as a mileage or low oil life trigger. The notification system selects an appropriate template based on the type of trigger and uses that template to build and send to the subscriber an email message that contains the dynamic vehicle information and identifies any detected vehicle condition for which action is needed. In addition to trigger type, different templates can be defined for each combination of vehicle type (e.g., make of vehicle), trigger type, and a language preference (e.g., English, Spanish).

30 Claims, 8 Drawing Sheets

U.S. PATENT DOCUMENTS

| | | |
|---|---|---|
| 2006/0217848 A1 | 9/2006 | Oesterling et al. |
| 2007/0093947 A1 | 4/2007 | Gould et al. |
| 2007/0171029 A1 | 7/2007 | Inbarajan |
| 2007/0173986 A1 | 7/2007 | Inbarajan |
| 2007/0179798 A1 | 8/2007 | Inbarajan |
| 2007/0179799 A1 | 8/2007 | Laghrari |
| 2007/0179800 A1 | 8/2007 | Oesterling |
| 2007/0191995 A1 | 8/2007 | Laghrari |
| 2008/0021964 A1 | 1/2008 | Inbarajan |
| 2008/0039995 A1 | 2/2008 | Reeser |

* cited by examiner

VEHICLE EMAIL NOTIFICATION USING TEMPLATES

CROSS-REFERENCE TO RELATED APPLICATION

This application claims the priority of U.S. Provisional Application No. 60/755,329, filed Dec. 31, 2005, the entire contents of which are hereby incorporated by reference.

TECHNICAL FIELD

This invention relates to techniques for wirelessly collecting vehicle information and providing that information to the vehicle owner or other authorized person.

BACKGROUND OF THE INVENTION

Telematics units are now widely in use on vehicles to provide drivers with various types of wireless assistance services (WAS). For example, "roadside assistance" which historically involved a disabled vehicle and a physical visit to the vehicle by a serviceman, can now in many instances be provided remotely via wireless telecommunication with the vehicle through existing cellular network facilities. Thus, a telephone call to a call center (WAS center) can be used to electronically unlock doors where the keys have inadvertently been locked inside. Also, navigation and emergency assistance services can be obtained by voice communication with an advisor at the call center. Monitoring of vehicle operating conditions by the call center is also possible via the telematics device. For example, an air bag deployment event can be automatically reported to the call center where it triggers a return call to the vehicle from a live advisor to determine if emergency services are needed. Other vehicle data such as diagnostic trouble codes (DTCs) can similarly be reported to the call center.

SUMMARY OF THE INVENTION

In accordance with one aspect of the invention, there is provided providing vehicle information to an owner or other recipient, comprising the steps of:
  (a) accessing vehicle data using a telematics unit of the vehicle;
  (b) transmitting the vehicle data from the telematics unit to a central data system;
  (c) selecting a message template from among a plurality of message templates;
  (d) constructing a notification message using the selected message template; and
  (e) sending the notification message to a recipient via an electronic messaging system.

The templates can include predefined static content, such as predefined text used in the notification message. Different templates can be used in different circumstances. For example, after a vehicle is purchased or leased, a welcome email notification message can be sent to the subscriber, with this email being constructed using a welcome template. Thereafter, monthly email notifications can be sent, with the monthly notifications being constructed using a monthly template. Other templates for specific notifications can also be used; for example, for low oil life and to report the occurrence of other specific diagnostic warnings.

In accordance with another aspect of the invention, vehicle data can be sent to a central data system based on the occurrence of a trigger, and a message template then used to build a notification message sent to a recipient. The particular message template used can be selected based on the type of trigger; for example, a monthly trigger would result in one template being selected whereas an low oil life trigger would result in a different template being selected.

In accordance with another aspect of the invention, a software-implemented administrative tool can be used to input static notification message content that is then used along with data from the vehicle to build a notification message that is then sent to the subscriber.

In accordance with yet another aspect of the invention, notification messages can be generated using vehicle data and a template that defines a plurality of different sections, with only those sections applicable to the particular vehicle being used in constructing the notification message. Thus, for example, the template can define content for satellite radio services account information, or for recall information, and these corresponding sections can be entirely eliminated from the generated notification message if they are not applicable (e.g., if the owner does not have a satellite radio installed or if there are no recalls in effect for the vehicle).

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
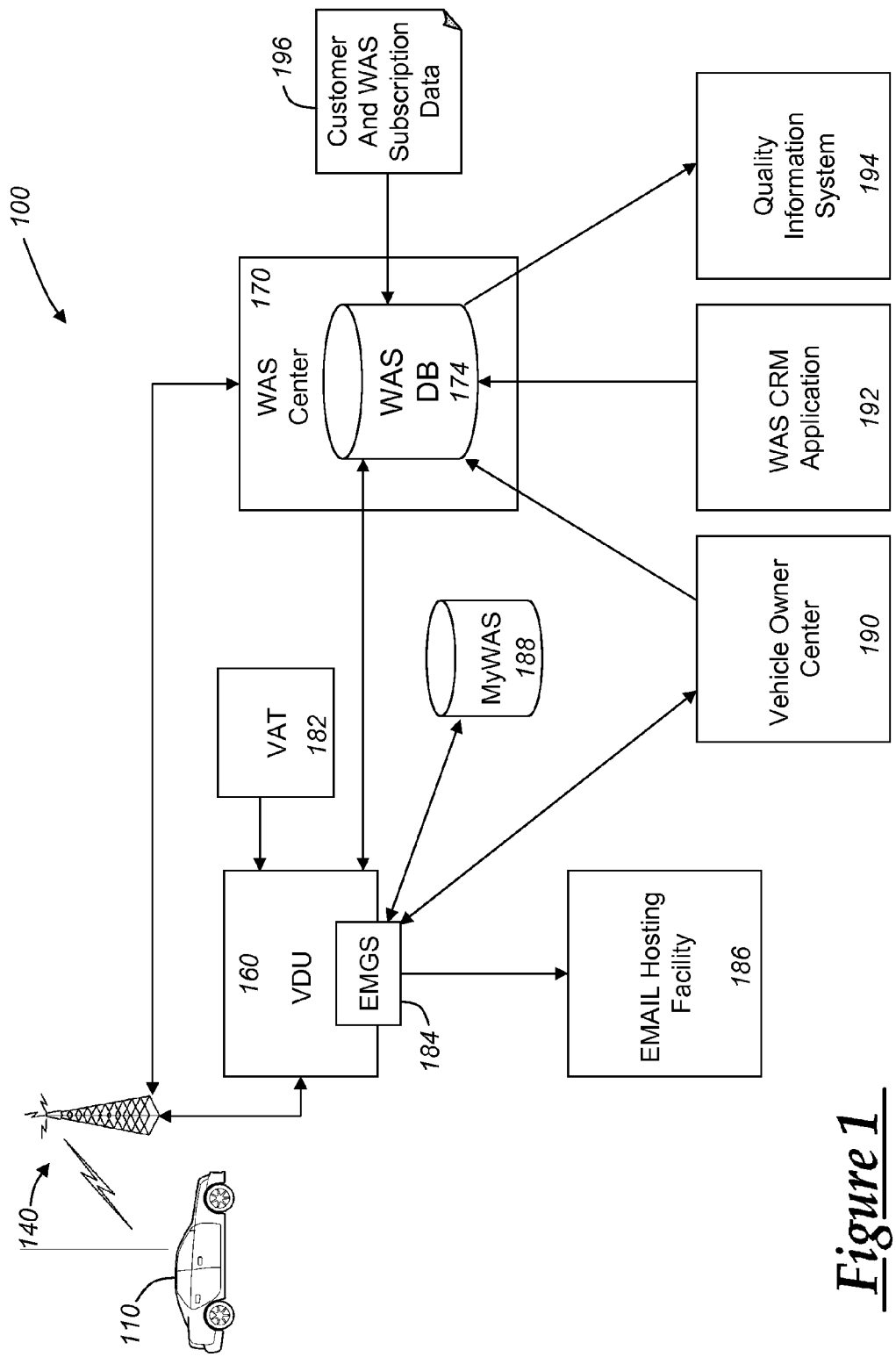
FIG. 1 is a block diagram of an email notification system constructed in accordance with the invention.

The following terms used herein have the ascribed meanings. "Vehicle data" means information concerning a particular vehicle's condition or operation; for example, mileage, remaining oil life, GPS coordinates, door lock state, diagnostic trouble codes (DTCs), diagnostic results, air bag activation. "Vehicle information" is information related to a particular vehicle; for example, vehicle data, maintenance information, recall information, wireless assistance services (WAS) account information, satellite radio account information. A "subscriber" is a person or entity who either has legal title to the vehicle (e.g., a purchaser, corporation, parent) or has possession of the vehicle for regular use (e.g., a lessee, employee driving a company car, licensed minor), or both (e.g., a purchaser-driver), and who has opted to receive electronic messages from the email notification system. "Owner" is used interchangeably with "subscriber" and has the same meaning, except that an owner need not necessarily be one that receives electronic messages from the email notification system. A "trigger" is a defined event or vehicle condition that, when met, initiates notification processing (e.g., every 30 days, remaining oil life <20%, mileage passes over 25,000 miles, ABS DTC received). "Notification processing" is the process of determining whether an electronic message should be sent to a subscriber and, if so, the content of the message. "Language characters" are the individual components of a written language (e.g., alphanumeric characters), whether represented graphically using a graphics file format or represented textually or as characters using, for example, ASCII or some other type of numerical encoding. A "diagnostic result" is specific or general information concerning a monitored vehicle component, system, or operating condition. A specific diagnostic result could be, for example, the amount of oil life remaining (e.g., on a percentage basis 0-100%), whereas a general diagnostic result could be, for example, a graphical indicator such as a green, yellow, or red graphic that indicates whether some action is required to address one or more of the vehicle conditions and possibly the importance or severity of the vehicle condition. An "electronic message generating system" (EMGS) is an electronic system that builds and sends electronic messages such as Internet email messages. An "electronic messaging system" is a public or private email system, or any other system suitable for transmitting electronic messages to specific recipients, including text messaging using SMS (short messaging services) and including MMS (multimedia messaging services).

The illustrated embodiment is directed to a vehicle email notification system and method in which triggers are used to initiate the generation and transmission of email messages that provide diverse types of dynamic vehicle information to the subscriber. The email notifications are triggered by different events, some of which are independent of the vehicle (e.g., a 30 day trigger to provide the subscriber with a monthly vehicle status report), and others of which occur at the vehicle, such as a mileage or low oil life trigger. Upon occurrence of a trigger, the notification system builds and sends to the subscriber an email message that contains the dynamic vehicle information and identifies any detected vehicle condition for which action is required or desired. The vehicle information generally falls into four categories: (1) diagnostic information; (2) maintenance information; (3) recall information, and (4) ancillary services information, such as account information for such things as wireless assistance services or satellite radio services. The email notification messages also provide supplemental information such as dealer contact information, regional specific information (such as a particular state's child car seat laws or front passenger seat belt laws), maintenance service pricing quotes and/or coupons, state licensing renewal date and/or notification, and lease financing information (e.g., next monthly payment due date and amount). These and other features will be discussed below in greater detail.

As shown in FIG. 1, the disclosed email notification system 100 contains a number of different system components interconnected by one or more communication links. The vehicle 110 communicates with the remainder of the notification system via a wireless communication network 140, such as a cellular communication system that uses CDMA or other suitable communication technology. For this purpose, the vehicle 110 is equipped with a wireless communication module having a suitable modem to enable voice and data transmission over the wireless communication network 140. Also onboard the vehicle are various vehicle systems modules (VSMs) that access different types of vehicle information which can then be transmitted via the wireless communication module. These vehicle systems include such things as a diagnostics module that accesses different vehicle systems to determine whether any fault conditions exist. For example, the diagnostic module can access the engine and powertrain systems, the air bag system, antilock braking system, and the wireless communication module itself to obtain diagnostic information and even initiate a diagnostic check of these systems. Apart from diagnostics, the vehicle can include vehicle body and engine computers that can provide other dynamic vehicle information such as mileage and remaining oil life information. The construction and operation of each of these onboard vehicle systems is well known in the art and need not be discussed here in greater detail.

The vehicle communicates with a vehicle data upload (VDU) 160 system that lies at the operational heart of the notification system 100. In general, the VDU 160 handles initial configuration of each subscriber's notification account upon enrollment, the setting and processing of triggers, the acquisition of data needed for populating the email notification message, and the initiation of actual email generation. These functions are implemented utilizing information obtained from a variety of databases and other systems including, in particular, a VDU administration tool (VAT) 182, an electronic message generating system (EMGS) 184, an email hosting facility 186, a wireless assistance services (WAS) center 170 as well as a user-configurable WAS website 188, and several other systems that supply information to the WAS center 170. As shown in FIG. 1, these other systems include a subscriber services center 190, a CRM application 192, a quality information system 194, and a third party customer data and WAS subscription service 196. Rather than maintaining the data in distributed databases or other systems, all of the needed information can be stored in a single database using different schemas in the database. These and other approaches for data management and handling will be known to those skilled in the art.

The VDU administration tool (VAT) 182 is used to set up the VDU 160 and EMGS 184 by providing the basic content of the email messages along with various configuration items for the generation and sending of the messages. For example, the VAT 182 can provide various configurable parameters such as the type of email (plain text, html, SMS), the number and timing of email resends when a failed send is detected, and the conditions under which an alternate email address is used. The VAT is also used to specify various aspects of the VDU-to-vehicle communication, such as the conditions under which a call is placed by the vehicle back to the VDU (e.g., vehicle ignition ON only, OFF only, or DON'T CARE) or the grace period (e.g., 60 days) that the subscriber is given following the end of their WAS subscription period before the vehicle-to-VDU communication capability is switched off.

The email notification messages generated by the system include both static content (predetermined text and possibly graphics) as well as dynamic content (information that normally changes over time). This static and dynamic content is accessed from different sources shown in FIG. 1 and combined into one digital file that constitutes the email message. Constructing the email message is preferably accomplished using one or more predefined templates with the VAT 182 specifying which template is to be used. Different templates can be used for different vehicle types and/or different types of triggers. The construction and content of the email messages and the use of these templates will be discussed in greater detail below in connection with FIG. 3.

The electronic message generating system (EMGS) 184 is initiated by the VDU 160 as the result of a vehicle trigger received by the VDU. It obtains the dynamic and static vehicle information from the VDU 160 and in some cases directly from other sources and builds the email message using the predefined template that has been specified by the VAT 182. Once the email is built, it is sent via the Internet by way of the email hosting facility 186 which actually handles the queuing and transmission of the email using standard Internet mail protocols such as smtp.

Some of the vehicle or subscriber-specific static information used in the email message (subscriber name, dealer information, WAS account number, etc.) is obtained from the WAS database 174 which includes information originally obtained from yet other systems. For example, basic customer (subscriber) information can be maintained by a third party service 196 that provides a single source of cleansed customer data along with subscription and renewal information for their WAS account. Customer information from the CRM system 192 can also be used included in the WAS database 174. Subscriber-provided information inputted into a subscriber's website 190 (e.g., the mileage at the last oil change) can also be provided to the WAS database 174. This information can be used by the WAS center 170 to assist a live advisor in handling customer inquiries and addressing vehicle problems monitored by the WAS center. For the generation of the email notifications, at least some of this information is pulled from the WAS database 174 by the VDU 160 and provided to the EMGS 184 for inclusion in the email message. Personalized information previously supplied by the subscriber to a user-customizable WAS website 188 (MyWAS) can also be accessed automatically by EMGS 184 and included into the email. An example would be a user-supplied digital photograph of their vehicle which could be included in the email.

The subscriber can also customize certain aspects of the system, such as the number of days used for the periodic triggers that generate status email notifications. Thus, rather than having a 30 day trigger, the subscriber can customize the trigger to occur perhaps once per week or once per quarter. This can be done via the subscriber website 190 which provides limited access to the VAT 182 to configure these items in the VDU 160.

Vehicle diagnostic and other information obtained from the vehicle by the VDU 160 can also be provided to the WAS database 174 for later retrieval by a live advisor or for other purposes. Also, at least some of this information can be supplied to the quality information system 194 for warranty analysis, trending and other evaluations. The provision of such information to the quality information system 194 can be automatic on every trigger, only for certain triggers, or only under certain conditions. For example, the mileage and oil life reading can be provided to the system 194 only in those instances where there is a DTC or particular DTC that has occurred.

Figure 2:
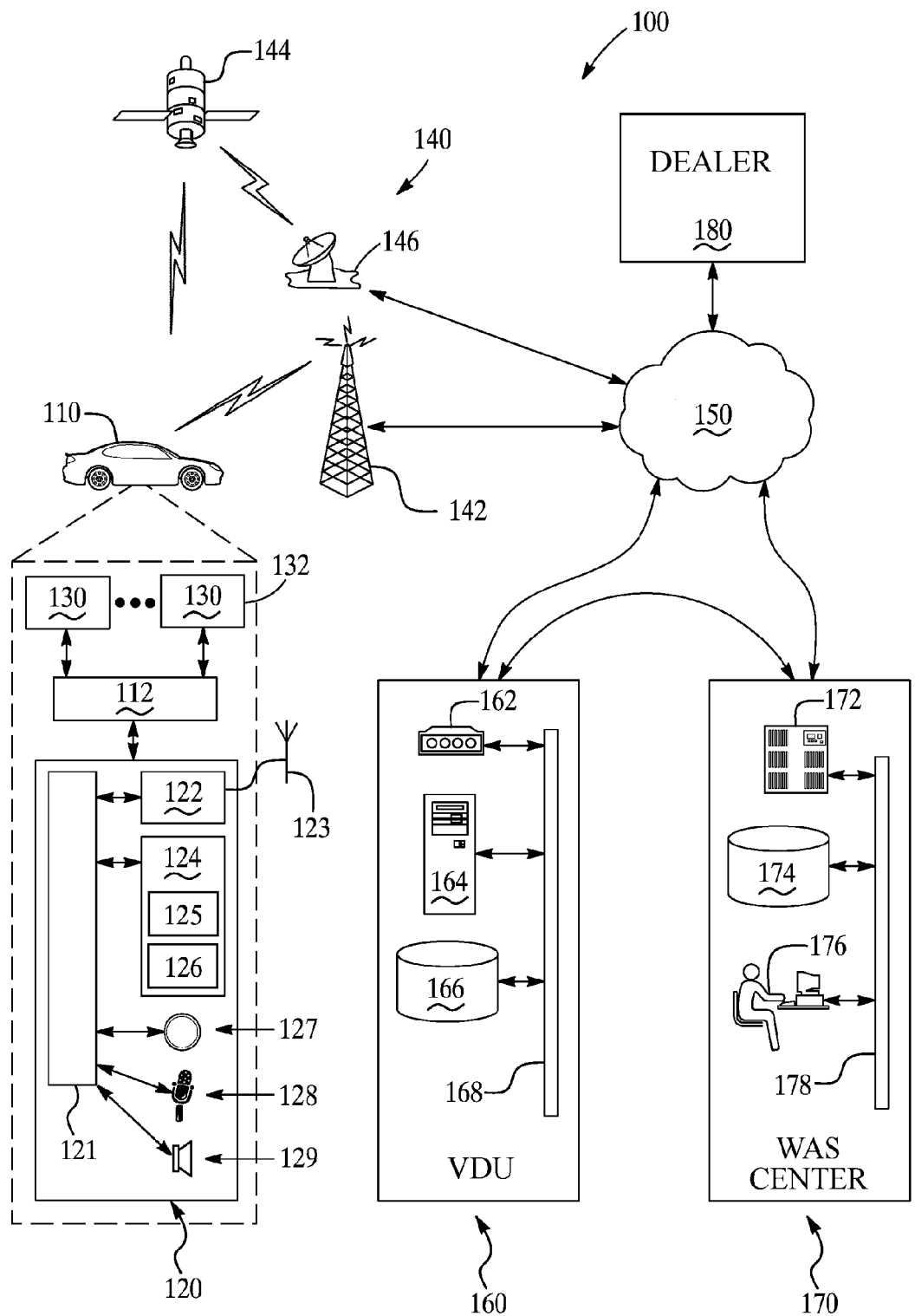
FIG. 2 is a block diagram of the email notification system of FIG. 1 showing additional details of the vehicle electronics system, VDU, and WAS center depicted in FIG. 1.

Before turning to the specifics of the email notification message itself, reference is made to FIG. 2 which provides some additional information concerning various centralized and onboard vehicle systems needed to implement the email notification system 100. The construction and operation of these onboard vehicle systems will be apparent to those skilled in the art given the functional descriptions provided herein in combination with the knowledge generally available about existing systems currently in use and the level of skill in the art. As shown in FIG. 2, motor vehicle 110 is depicted as a typical passenger sedan, and it will be appreciated that other mobile vehicles such as marine vehicles, aircraft, and other automobiles (e.g., vans, gas and diesel trucks, etc.) can be used as long as they are fitted with an appropriate wireless communication module that is connected onboard to communicate with the one or more vehicle systems from which vehicle information is to be obtained. Located within vehicle 110 are various electronic modules that include a telematics unit 120 connected by way of a on-board vehicle network 112 to one or more vehicle system modules (VSMs) 130. As will be described in greater detail, telematics unit 120 includes the vehicle's wireless communication module and this unit provides communication and interactivity with the driver and with various remote locations including the VDU 160, WAS center 170, and the dealer service center 180. The VSMs 130 provide various on-board vehicle diagnostic, monitoring, control, and reporting functions. For example, one VSM 130 can be used for controlling engine operation (e.g., fuel injection and ignition timing), while another VSM 130 can be a safety system that handles monitoring and deployment of air bags or other SIR safety systems on the vehicle. In the embodiment of FIG. 1, the VSMs include a diagnostic VSM 132, such as an on-board diagnostic system (e.g., an OBD-II system) which performs a diagnostic check of various vehicle sensors.

In facilitating interactions among the various communication and electronic modules, vehicle communication network 112 uses any suitable network communication approaches, such as controller-area network (CAN), ISO Standard 9141, ISO Standard 11898 for high-speed applications, ISO Standard 11519 for lower speed applications, SAE Standard J1850 for high-speed and lower speed applications, and/or the like.

Telematics unit 120 can be implemented in various ways, but in the illustrated embodiment includes a processor 121, a wireless communications module 122 for communication to and from the vehicle via one or more antennas 123, a digital memory 124 which stores programs 125 and a database 126, one or more pushbutton switches 127 and a microphone 128 and one or more speakers 129 for enabling voice communication with the WAS live advisor and for use in hands free calling (HFC). Processor 121 can be implemented in various ways known to those skilled in the art, such as by a microprocessor or an application specific integrated circuit (ASIC). Processor 121 executes one or more computer programs 125 to carry out its various functions of monitoring and processing data and communicating with the vehicle system modules 130, vehicle user, and remote locations. As a part of the email notification system 100, it is also used to set the various triggers requested by the VDU 160 and monitor for the occurrence of a trigger and then initiate a call back to the VDU when the trigger occurrence is detected. Alternatively, a dedicated VSM 130 could be provided for trigger handling.

Communications module 122 provides wireless communication via cellular (e.g., CDMA, GSM), satellite, or other wireless path, and includes the ability to provide for both voice and data communications. This allows data communication with at least the VDU 160, as well as voice and, if desired, data communication with the WAS center 170 and dealer 180.

Memory 124 can any digital storage device that provides computer-readable storage of data and programs for use by processor 121. This includes volatile and/or non-volatile memory storage and can be implemented as one or more separate physical devices.

Programs 125 include one or more computer programs that are executed by processor 121 to carry out the various functions of telematics unit 120. The database 126 includes storage of the triggers set by the VDU 160 as well as associated information such as a listing of the vehicle systems to be accessed for purposes of acquiring and reporting dynamic vehicle information back to the VDU.

Although depicted in FIG. 2 as separate individual modules, it will be appreciated by those skilled in the art that many of the components of telematics unit 120 can be integrated together, or integrated and/or shared with other vehicle systems so that, for example, memory 124 can be incorporated into processor 121 or located outside of telematics unit 120 and shared with one or more other vehicle systems.

Wireless carrier system 140 can be a cellular and/or satellite wireless communication system used to transmit voice and data between the vehicle 110 and various remote locations such as shown in FIG. 1. In one embodiment, wireless carrier system 140 is implemented as a CDMA, GSM or other cellular communication system 142 that exchanges voice and data between the vehicle 110 and communication network 150. Additionally or alternatively, wireless communication can be by way of satellite transmission which uses one or more satellites 144 to connect the vehicle to the communication network 150 via, for example, a central, ground-based satellite facility 146. Communication network 150 can be a land-based wired system such as the public telephone system and/or cable system used for telephony and data communication including communication that is carried out over the Internet. For purposes of the embodiment discussed herein, the wireless communication between the vehicle 110 and VDU 160 is by way of a cellular system 142 and the satellite 144 is used to provide ancillary services such as GPS coordinates or a satellite radio feed.

VDU 160 is a central data system that can be implemented using one or more computer systems located either at an independent remote location or, for example, at the WAS center 170. A typical computer system is shown in FIG. 2 and includes a modem and/or router 162, a computer 164, and database 166 all connected by an Ethernet LAN 168. Database 166 can be implemented using a separate network attached storage (NAS) device or can be stored on a computer 164 itself, or can be located elsewhere, as desired. The computer 164 has an application program that handles all of the VDU processing, including communication with the vehicle 110 and the setting and processing of triggers. VDU 160 can also communicate with WAS center 170 and/or the dealer service center 180 either via network 150 or by some more direct path. Suitable hardware and software configurations are known to those skilled in the art. While VDU 160 is depicted as being implemented using a single computer 164, it will be appreciated that the various functions carried out by the VDU can be implemented using a number of local or distributed computers. Furthermore, VAT 182 and EMGS 184 can both be implemented either as standalone systems or can be separate processes running on the same hardware used by the VDU 160.

WAS center 170 can be one or more locations staffed by one or more live advisors 176 who handle calls from vehicle drivers and/or who monitor for various vehicle conditions such as an airbag deployment. The WAS center can include one or more servers 172 that include the necessary communication capabilities with network 150, data storage 174, and a LAN 178 for connecting these components together along with the computer(s) used by the live advisors 176. If desired, the VDU 160 can be integrated into WAS center 170 rather than utilizing two separate systems. Suitable call center facilities are known and currently in use to provide remote live assistance in connection with in-vehicle safety and security systems. Apart from using live advisors, the advisor 176 can be implemented as an automaton or a program running on a computer operatively disposed to respond to subscriber requests.

Dealer service center 180 is a vehicle dealership where vehicle maintenance and repair is carried out. The dealer service center is connected by way of communication network 150 with the vehicle 110 so that the driver can initiate a telephone call with a technician or service scheduler at the dealership.

Figure 3:
FIG. 3 is an exemplary email notification message produced by the system of FIG. 1.

Turning now to FIG. 3, there is shown an exemplary email notification message generated by the system. The email message is made up at least in part using language characters, whether as words using the English alphabet or a different foreign language that utilizes textual or graphical characters. The illustrated email message is provided using html to provide attractive formatting and display of the message contents. Other markup languages such as xml can be used as well. Alternatively, the email can be provided as plain text with no formatting or markup language used. The email message itself is formatted into a number of regions, including an upper region that provides basic vehicle and introductory information, a second region that provides diagnostic information, a third region that provides maintenance information, a fourth region that lists various notifications (possible vehicle recalls and ancillary services account and subscription information), and a fifth region that provides miscellaneous information such as dealer contact information. As shown, the message can also contain a header and footer, with the header providing space for a company logo and tabs that connect the user to different websites, such as the main website for the WAS services. The footer can provide support contact information, use of information legal disclaimers, etc.

The first, upper region contains an introductory message such as shown. This message is built using an email template that is particular to the type of trigger that initiated the email. For example, the illustrated email message of FIG. 3 is a welcome email that is generated and sent to the subscriber within 24 hours of their enrollment into the service. Although this email could be automatically generated and sent by the notification system 100 without communicating with the vehicle 110, it is desirable to include different pieces of vehicle information in the email message including, for example, mileage, remaining oil life, and the diagnostic status of various vehicle systems. Thus, this email is built using a welcome template that includes the static content (predefined text) from the template as well as fields denoting vehicle-specific information. These fields are populated with the appropriate data accessed from the WAS database 164 or elsewhere, as discussed above. The fields can be identified using xml or in any other suitable manner. Dynamic content related to the individual subscriber or his or her demographics can be included in this upper region as well. Similarly, the content of this region could be automatically varied by the EMGS 184 in accordance with certain features of the subscriber's WAS subscription, such as how long they have been enrolled, where they are in a particular subscription period, and according to other aspects related to where the subscriber is in the WAS lifecycle.

The welcome message text of this first region also identifies three action indicators: green (no issues found), yellow (action suggested), and red (immediate attention required). These action indicators are represented by symbols as shown, and these symbols and their short textual description are preferably included in each email. At the right side of the first region, a digital photograph of the make and model (and preferably style and color) of the subscriber's vehicle is provided. This picture can either be accessed from a standard library of vehicle pictures, or can be a user-supplied photograph of his or her own vehicle obtained, for example, from the personalized WAS website. Underneath the pictured vehicle is the particular VIN number for the vehicle so that the email provides a convenient source of this information when needed by the subscriber.

The second through fourth regions of the email message are each separated into a number of sections, with each section relating to a particular type of information useful to the subscriber. For the diagnostic region, in the example provided in FIG. 3, it is divided up into four sections: engine and/or transmission, air bag system, antilock braking system (ABS), and the vehicle wireless communication module. Each section includes a section label identifying the particular vehicle system, a diagnostic test status indicator, and a diagnostic result indicator. The diagnostic test status indicator identifies whether or not the diagnostic test of the vehicle system was successful—if so, the email message includes a "Diagnostic: Completed." If the test did not complete, the message can state "Diagnostic: Failed." along with a request to contact the WAS support. The diagnostic result indicator provides the subscriber with a general diagnostic result about the particular vehicle system, and this diagnostic result indicator can be implemented using the action indicator symbol noted above (green, yellow, or red symbol), and the section can further state whether some action is required by the owner to address a problem or abnormal condition identified during the diagnostic test. A hypertext link to more information can also be provided to give the subscriber additional information about the diagnostic test that was run and what the results mean.

The maintenance region of the email message includes a first section that provides information concerning the remaining engine oil life and a second section that provides vehicle mileage information. The colored action indicators are used here as well to identify whether any action is needed by the owner.

Where some servicing is required, either for maintenance or to address diagnostic issues, the email message can include a link to a dealer to schedule the vehicle service, or can provide pricing or coupon information to encourage the subscriber to obtain the necessary service either from a particular dealer or any local dealer. For example, where an oil change is needed, the email message can include a notice stating that the subscriber can print out the email message and take it with them to the dealer to obtain a discounted price or additional services when having the engine oil changed. Alternatively, the email message can provide a link that the subscriber can click to access a dealer coupon, and this coupon can either provide a general discount that is unrelated to the specific vehicle service needed or can be specifically tailored to the servicing required (for example, by offering additional related services or by providing specific pricing or discounts for the service needed).

The notification region is separated into four sections: vehicle recalls, WAS account and subscription information, hands free calling (HFC) account information, and satellite radio account and subscription information. The recall section lists each recall in effect and can provide additional detail concerning the purpose and scope of the recall. Only recalls applicable to the particular vehicle involved are reported. The WAS subscription section identifies the subscriber's account number, type of service plan, and expiration date, and can include additional information if desired. The hands free calling section provides information on cellular voice telephone services that are available through the same wireless communication module 122 that is used to provide the WAS services. This section identifies the vehicle telephone number along with account information. For prepaid plans or monthly plans that offer a fixed number of included minutes, the number of remaining minutes is provided. The satellite radio account section provides account and subscription information for satellite radio services. As shown for the WAS subscription section, any of these renewable services can include a button in their individual section to redirect the subscriber to a subscription renewal website, and these buttons can be provided only once the renewal date approaches (e.g., within 120 days of the renewal date). Also, each of the ancillary services sections preferably include the ability for the user to click through to the service website itself to obtain additional account information, etc. Other sections can be shown in this notification region. For example, where the vehicle's registration is near expiration (e.g., within 60 days), if this information is included in one of the databases accessible to the VDU or EMGS, then a state registration renewal notification with contact information and hypertext links can be provided in the email.

The fifth region can be used for miscellaneous information such as the dealer contact shown. This can include a link to the dealer website and/or selection of a "mailto:" or similar link that initiates an email message to the dealer. Some or all of the vehicle information (VIN, mileage, diagnostic results, etc.) can be automatically included in this dealer email by suitable programming or scripting known to those skilled in the art. Alternatively, the entire subscriber's notification email can be included in or attached (e.g., forwarded) as a part of this dealer email. Apart from dealer information, insurance information and lease or loan information can be included in this fifth region as well, or can be included in another dedicated or shared region of the email. These other sections can include information for the subscriber such as insurance contact information or loan balance and payment due date information, as well as the ability to direct an email to the insurer or loan company.

As mentioned above in connection with the various vehicle systems that provide vehicle information and wireless communication, each of the ancillary service systems that provide, for example, the WAS, HFC, and satellite radio services, are existing systems and the construction and operation of these systems are known to those skilled in the art. Similarly the interconnections and programming necessary to interface with these systems and extract the desired accounting and subscription information are also known to those skilled in the art.

In some instances, there will be no information to be placed in a particular region or section of a region. For example, when there are no recalls in effect for the vehicle, or once the vehicle has had the recall servicing performed, the recall section will be empty. If desired, this can be implemented by a short message placed in the section such as "No recalls in effect." Alternatively, it may be desirable to eliminate the section altogether, in which case the email template will include a provision for collapsing the section out of existence if there is no data to display. This can be done for other regions; for example, where the vehicle does not have an ABS system, or as another example, if the notification system is designed to allow subscribers to customize their email reports, one subscriber might wish to display powertrain systems diagnostic information whereas another might not. Rather than providing separate templates for each such potential combination of notifications, the email template can be setup to collapse the undesired sections of the diagnostic region for those users who do not want to see that powertrain information. This subscriber customization could be implemented via the VAT 182 through the subscriber website 190, and the configuration for that subscriber can be stored in the VDU database 164. Preferably, the sections are collapsed only when it is desired not to display the related information (e.g., no recalls in effect, or subscriber does not want powertrain information included). Where there is no data available for a section that is to be displayed (e.g., the diagnostic test failed and no data has been reported), then rather than collapsing the section, a diagnostic failed message is displayed, as discussed further above. This same approach can be used for the other regions so that, for example, where no satellite radio account information is available because that third party system is offline, then that fact would be noted rather than collapsing the satellite radio section out of existence.

As noted above, the template used can be selected using the VAT 182 and this can be done by providing a plurality of different templates from among which the system selects the appropriate template based on the type of trigger and/or type of vehicle. Other selection criteria can be used as well; for example, based on a language preference such as English or Spanish. This language preference can be supplied by the subscriber with via a website (MyWAS 188 or the owner center 190) or to the dealer or to the WAS center 170 such as by way of a call from the vehicle. This permits the subscriber to customize this language feature of the templates in the same manner as is done for the other customizable template features discussed above. In implemented the use of multiple selection criteria for template selection, a different, unique template can be defined for each combination of selection criteria. For example, if vehicle type, trigger type, and language preference are used in selecting the appropriate template, there will be a different template for each different combination of these three criteria. Thus, for example, a monthly email constructed for an English speaking Cadillac® owner will be constructed using a different template than a monthly email constructed for an English speaking Chevrolet owner. This allows a vehicle manufacturer to provide different looks to the emails that vary by brands to help perpetuate brand identities.

Figure 4:
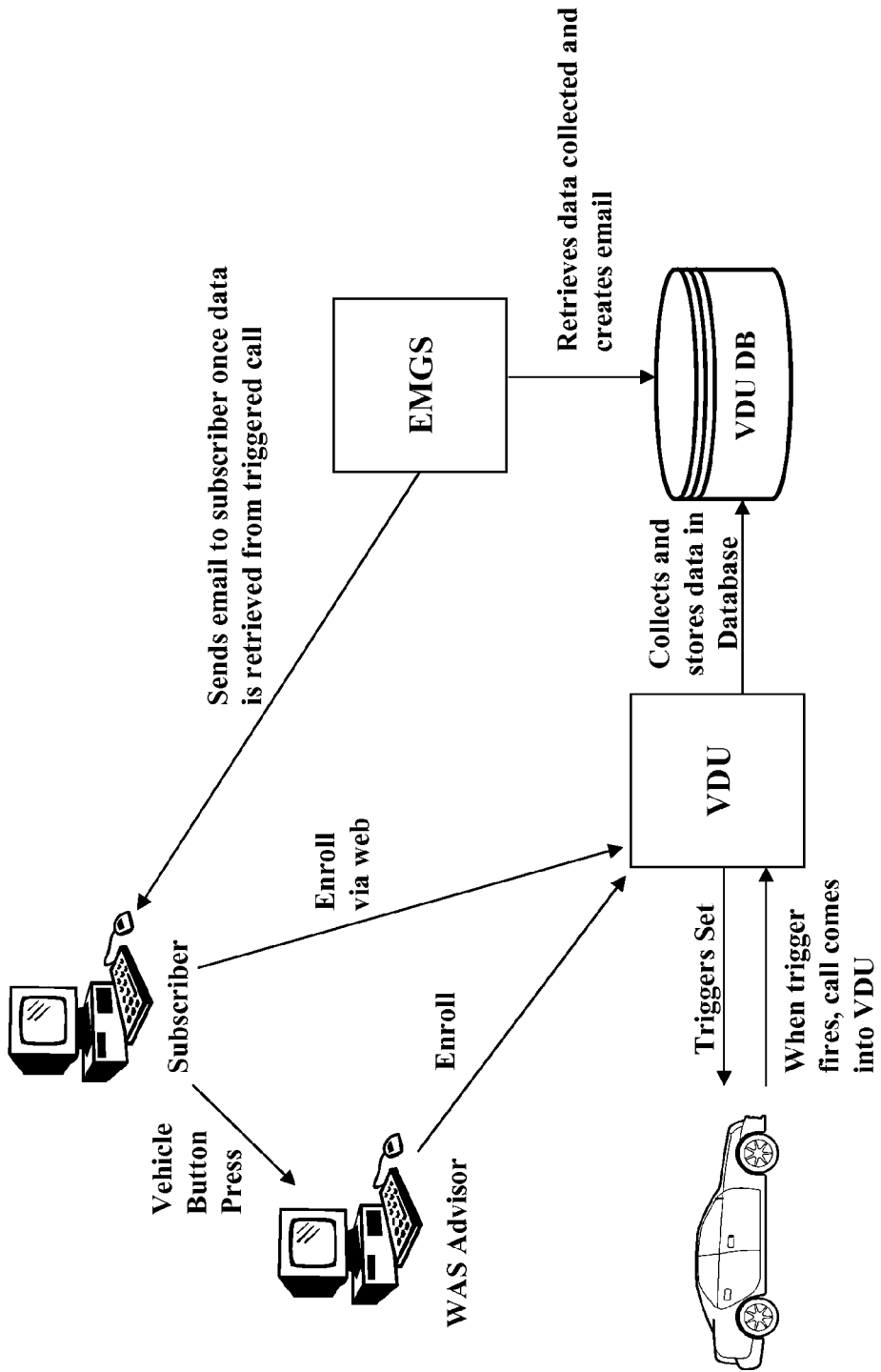
FIG. 4 provides an overview of the process for enrollment in the email notification system of FIG. 1.

Referring now to FIG. 4, there is provided an overview of the process for enrollment into the notification system 100, setting and processing of triggers, and the subsequent generation and transmission of the notification emails. The subscriber can enroll via one of several methods, two of which are shown. As one method, the subscriber can enroll through a website that is either dedicated to this service or incorporated into a more comprehensive vehicle services website, such as the subscriber website 190 shown in FIG. 1. A second method is by placing a call from the vehicle to a WAS live advisor 176 which can be done by using the WAS advisor call button 127 mounted in the vehicle to initiate a voice call with the advisor. The live advisor 176 then has computer access to the subscriber's account information and to the VDU 160 for the purpose of carrying out the enrollment. Other methods of enrollment include a direct landline call into the VDU 160 or enrollment via the dealer 180 from which the vehicle was originally purchased or leased. Once enrolled into the service, the VDU 160 initiates a communication session with the vehicle 110 which, in the disclosed embodiment involves placing a call to the vehicle wireless communication module 122 via the wireless communication network 140. During this call, the VDU 160 supplies the vehicle with one or more triggers. This can include a time based trigger (e.g., monthly) and/or triggers based on vehicle conditions (e.g., the occurrence of certain DTCs or an oil life trigger). Then, upon occurrence of a trigger, the vehicle 110 initiates a communication session (e.g., call) with the VDU 160 and supplies the dynamic vehicle information needed for the email notification message. The VDU 160 stores this information either internally in the VDU database 174 and/or provides it to the WAS database 164 for storage there. The VDU also initiates the EMGS 184 process to build and then send the email message to the subscriber.

In this embodiment, all triggers are set in the vehicle and all monitoring for the occurrence of a trigger happens at the vehicle. However, it will be appreciated by those skilled in the art that at least some of the triggers can be monitored at the VDU end and then a call placed to the vehicle to obtain the desired diagnostic and other information.

Figure 5:
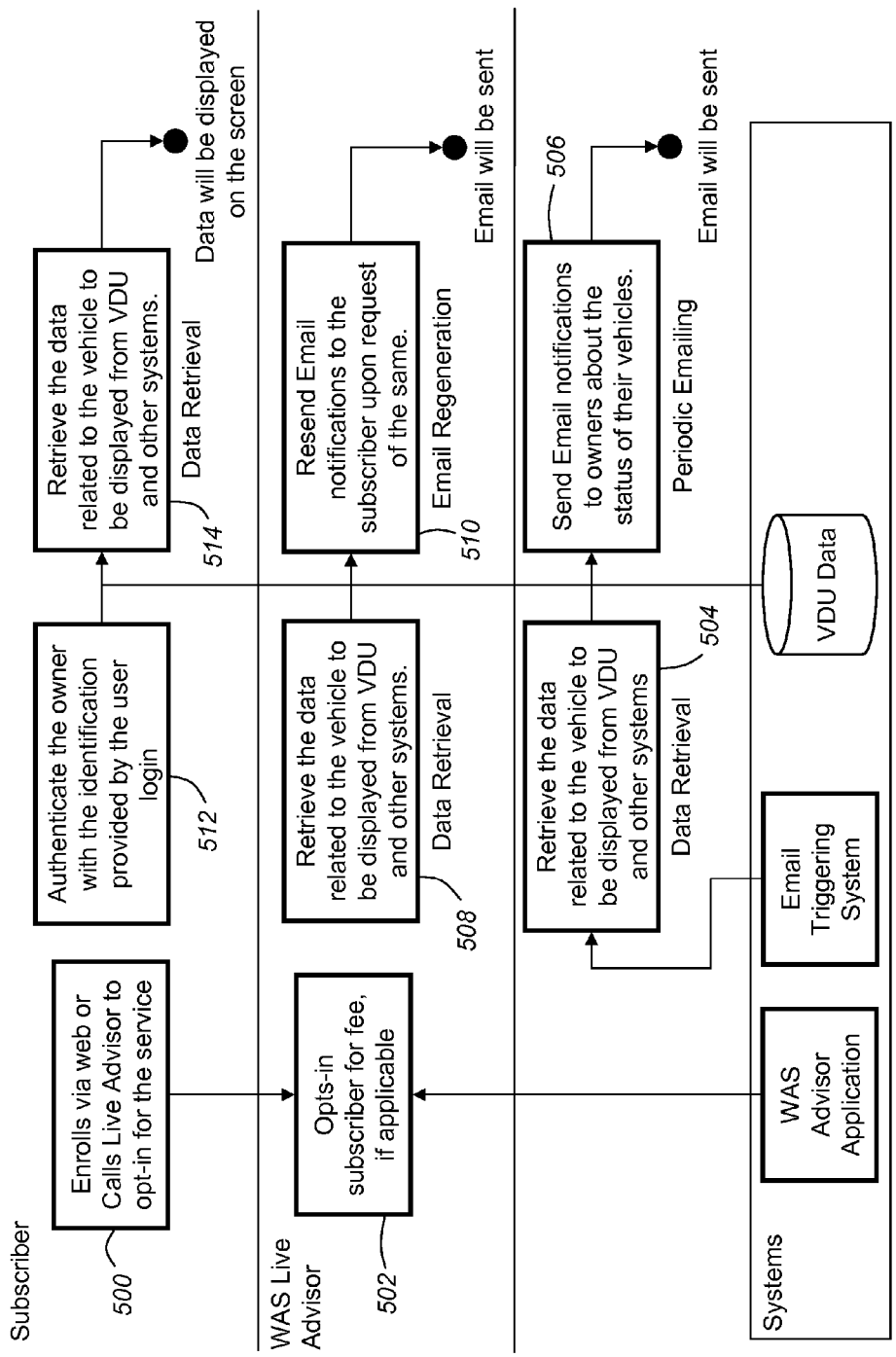
FIG. 5 is an overview of the steps carried out by the subscriber and WAS center advisor in the enrollment and email generation process.

FIG. 5 depicts the process flow involving the subscriber and live advisor 176 in the enrollment and email generation process. The individual steps shown in FIG. 5 are referenced below with numerals enclosed in parentheses. Enrollment via the live advisor involves an initial call from the subscriber to opt into the email notification program (500). When done via a button press within the vehicle, the needed vehicle specific information (e.g., VIN) is provided to the live advisor automatically which enables him or her to access the proper information concerning the vehicle and owner. Much of the owner information is normally accessible as the result of a customer delivery record (CDR) executed by the dealer at the time of vehicle sale. Using this information, the live advisor initiates the email notification program for the subscriber (502), and this typically involves the VDU setting an initial trigger to generate (504, 506) a welcome email as shown in FIG. 3, and this will then be followed by automatically triggered periodic emails (e.g., once every 30 days). For subscribers already enrolled, a call to the WAS center 170 can be used to specially request a notification email or a resend (508, 510) of the most recent email. This can be done via a button press of pushbutton 127 to access the live advisor 176 or to access a voice response unit which translates the driver's request into a command that is sent to the VDU 160 to generate the email notification message.

When enrolling via a web interface, such as the subscriber center 190, the system authenticates the subscriber via the identification provided by the user login (512) and from there the relevant vehicle and subscriber data is accessed and displayed for the subscriber (514). The subscriber can then complete the enrollment process following which the initial trigger is set in the vehicle that ultimately results in the welcome email and subsequent email notifications (504, 506).

Figure 6:
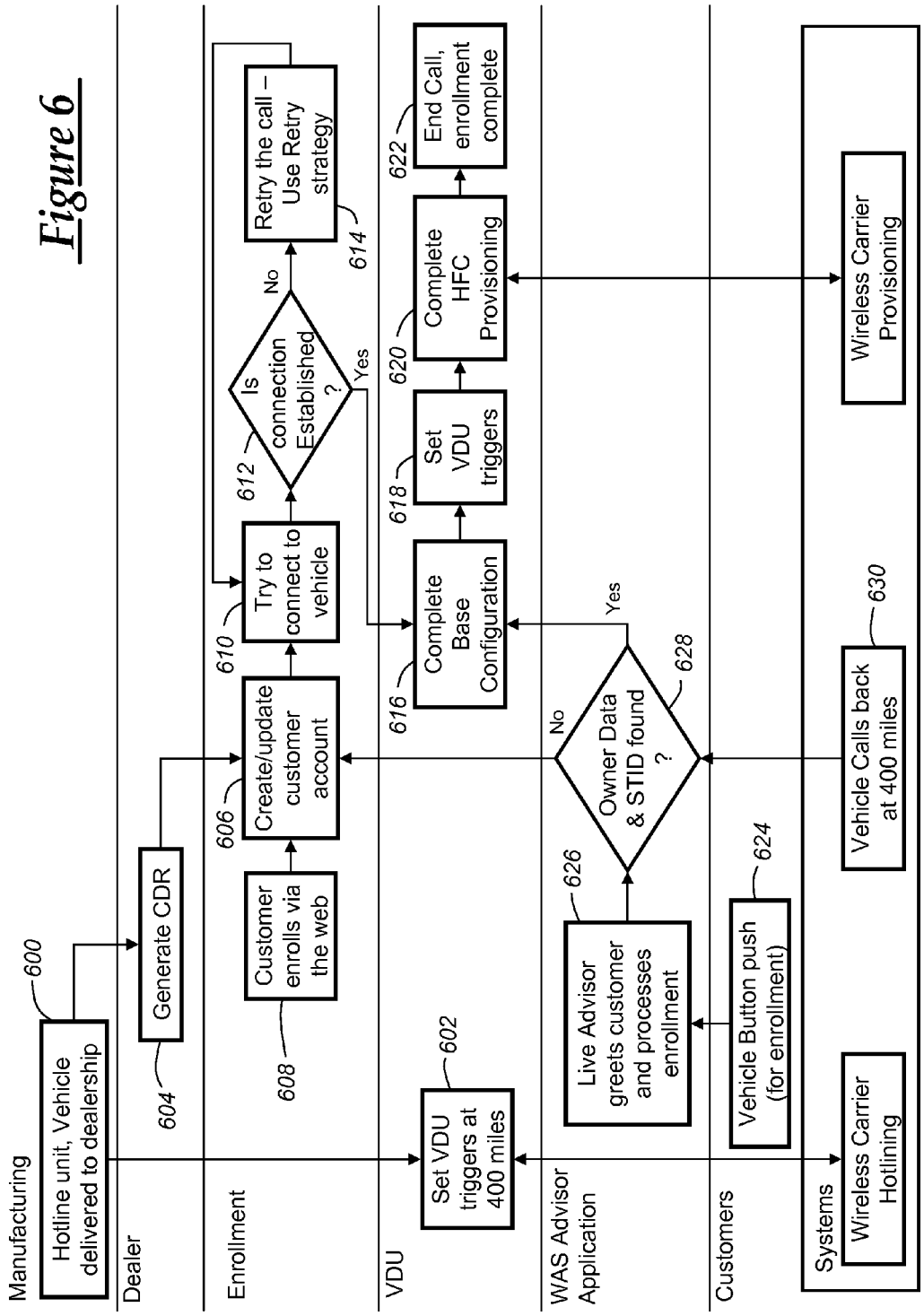
FIG. 6 provides greater detail concerning the enrollment process.

Portions of the enrollment process can be automated and FIG. 6 depicts greater detail concerning these features. Initially, the manufacturer hotlines the vehicle's wireless communication module 122 prior to delivery to the dealer (600). This hotlining can be carried out through the wireless network carrier and it causes any calls from the vehicle to be redirected to the vehicle manufacturer for proper setup of the vehicle wireless account. Prior to delivery to the dealer, the manufacturer can also set a 400 mile trigger on the vehicle (602) which will be used to help insure that the manufacturer receives the owner (customer) information and an opportunity to enroll the owner in the email notification program and other services (WAS, HFC, satellite radio, etc.). When the vehicle is delivered to the customer, the dealer creates a customer delivery record (CDR) that is generated (604) and then transmitted to the manufacturer and made available to the notification system 100. This CDR is used to automatically create a subscriber account for the vehicle (606). Alternatively, the account can be created using data obtained from the subscriber via a website (608) such as through the subscriber center website 190. Once the subscriber account is created (606), the system attempts to connect to the vehicle (610, 612) and, if not successful, implements a retry strategy (614) that might involve, for example, another call attempt after a predetermined amount of time or at a predetermined time of day.

Once a call to the vehicle is established, the VDU 160 then sets up its configuration for that vehicle (616), sets one or more triggers on the vehicle (618), and then completes the carrier provisioning (620) for HFC calling, etc. Apart from that discussed elsewhere in this description, the VDU setup configuration involves obtaining the station ID (STID) of the vehicle's wireless communication module 122, associating it with the VIN, and enabling the VDU operation for that STID. The carrier provisioning ends the hotlining and establishes preferred roaming lists and the like, as will be known to those skilled in the art. The call is then ended and enrollment is complete (622).

The subscriber can also enroll by pressing the pushbutton 127 in the vehicle (624) and connecting to the live advisor 176 at the WAS center (626). The live advisor accesses the system data to determine whether the customer account already exists and whether the station ID (STID) of the vehicle's wireless communication module 122 is already entered into the system (628). If not, the customer account can be manually setup (606) by the live advisor 176 and the initial connection attempt to the vehicle is carried out in the manner discussed above. If the account and STID are already setup in the system, then the process proceeds to setup the VDU configuration (616), set the vehicle triggers (618), and complete the carrier provisioning (620).

In the event that no CDR is created and supplied by the dealer at the time of vehicle delivery, and if the customer does not initiate enrollment and setting up of their account, the 400 mile trigger set in the vehicle by the manufacturer will initiate a call to the WAS center 170 when the vehicle odometer has reached 400 miles (630). As with the live advisor enrollment process, the WAS center 170 checks to determine whether a customer account already exists and whether the station ID (STID) of the vehicle's wireless communication module 122 is already entered into the system (628). The remaining enrollment and setup process is then the same as discussed above in the case of enrollment using the live advisor.

As will be appreciated from FIG. 6, as long as an account is setup via, for example, the use of a CDR from the dealer, the enrollment process can be entirely automated. This can be useful for commercial fleets where the purchaser wishes to have all vehicles uniformly enrolled in the email notification system 100. Automatic enrollment can then occur either directly following the creation of the account using the CDR, or can occur as the result of the vehicle calling due to the 400 mile trigger. Furthermore, apart from using a factory set (400 mile) trigger, an initial trigger can be set in the vehicle by way of a software robot that can be downloaded into the vehicle system. When the trigger goes off in each vehicle, the vehicle calls in and the enrollment is automatically established using the procedure described above. This allows a commercial entity to purchase a fleet of vehicles and then later enroll them en masse into the notification system. The equipment and programming needed to use software robots to download and set these triggers on the vehicle are known by those skilled in the art.

Other aspects that might be unique to fleet management can be included in the notification system 100. For example, for fleet vehicles equipped with GPS units, the location of the vehicle can be included in the data provided from the vehicle following a trigger, and this data can be included in the email notification showing where the vehicle is located either in coordinates or by mapping the location and including the map graphically in the email. Triggers can then also be defined that are based on location so that an email notification is generated and sent when the vehicle arrives at a particular location or moves outside of a defined geographic region. The email notification messages can be sent to the driver and fleet manager, or to only one of these. Furthermore, messages from the fleet managers to the drivers can be combined into the email notification messages so that, for example, the manager can generate a message to the drivers which causes the VDU to send an immediate callback trigger to each of the vehicles. Once a vehicle then calls back, the email notification message to the driver is generated and the manager's message is included in the email.

As discussed above, once enrollment and VDU configuration is complete in a typical individual subscriber scenario, an initial 24 hour trigger is set in the vehicle by a call from the VDU 160 to the vehicle 110. Once this trigger goes off in the vehicle, it calls back to the VDU 160 under the appropriate conditions (e.g., vehicle ignition ON) and provides the various vehicle information (mileage, oil life, diagnostic status of vehicle systems, WAS and other account information, etc.) which is then included in the welcome email that is built by the EMGS 184 and sent to the subscriber. The VDU then sets one or more additional triggers, preferably during this same call from the vehicle. These triggers include, for example, a monthly trigger to give the subscriber a complete vehicle and account status update once a month, as well as an oil life trigger to warn the subscriber when the remaining oil life is below a predefined amount (e.g., less than 20% oil life remaining). The oil life trigger can be set to go off when the oil life is below this threshold or within a range of values (e.g., 19.6% to 20%), but this can result in multiple triggers (repeat calls from the vehicle) each time it checks the oil life value. These repeat triggers can be used to send multiple messages to the subscriber or, if that is not desired, the repetitive triggers can be ignored by the VDU so only one email message is sent to the subscriber. Alternatively, the oil life trigger can be setup to go off when the oil life equals a predetermined amount (e.g., trigger goes off when oil life is at 20%, but not when it is above or below this amount), and this latter approach can be used to avoid getting repeat calls from the vehicle. Multiple oil life trigger points can be set if desired. The construction and operation of vehicle systems that monitor and determine remaining oil life are known to those skilled in the art.

Some triggers can be persistent triggers that are not cleared when they go off. For example, a monthly trigger set in the vehicle to go off on the 15$^{th}$ of each month need not be cleared, but can be left set as long as monthly triggers are desired. Such a trigger can be set to go off at a certain time of day so that it only occurs once on the appointed day of the month. Alternatively, some or all of the triggers can be cleared automatically or by request of the VDU each time they go off. This provides flexibility in handling different types of triggers. For example, with an oil life trigger, it can be cleared once it goes off, and can remain cleared with no new oil life trigger set until the oil is changed and the oil life goes back up to a reset point, either above the threshold trigger level (e.g., 20%) or to some higher reset limit (e.g., above 80%, or back to 100%). Once it is determined that the oil life is back to (or above) the reset point, the oil life trigger is reset which can be done, for example, by a new oil life trigger being provided by the VDU. Where the vehicle also uses monthly or other time-based triggers, these triggers can continue to be processed and used to report oil life regardless of whether the remaining oil life is above or below the threshold value. Thus, for example, oil life notifications can be sent to the subscriber using the following process:

(a) determining a remaining oil life by monitoring data at the vehicle;

(b) sending an oil life value from the vehicle to a central data system when the oil life falls below a first threshold;

(c) sending an electronic message to the subscriber using the oil life value obtained from the central data system;

(d) monitoring the oil life by iteratively repeating step (a); and (e) repeating steps (b) and (c) only after the oil life has exceeded a second threshold that is greater than the first threshold; and (f) periodically repeating the following two steps:

(f1) sending an oil life value from the vehicle to the central data system; and (f2) sending an electronic message to the subscriber using the oil life value obtained from the central data system.

The time-based (periodic) emails of step (f) can be carried out and processed independently of the oil life threshold approach of step (b). By using this method, the system avoids sending multiple emails due to low oil life yet continues to send the periodic (e.g., monthly) email reports. Once the oil life returns to the reset point (i.e., above the second threshold), then another low oil life email will be sent once that point is reached. Determination of the resetting of the oil life above the reset point can be done in any suitable manner, including by monitoring a calculated oil life and comparing it to the second threshold, or by detecting that the oil has been changed such as by a system reset carried out at the service station or dealer at the time of vehicle servicing. This process can be implemented by the use of triggers as discussed above, and the monitoring of oil life and resetting of the oil life trigger can be done at the back end (VDU) or can occur automatically at the vehicle so that no new call to the vehicle is needed to reset the oil life trigger.

When vehicle data is to be transmitted to the VDU as the result of a trigger, this data is preferably sent by the vehicle during the triggered call that is placed to the VDU by the vehicle. The desired vehicle data (diagnostic, mileage, etc.) can be pre-specified to the vehicle as a part of the initial setting of the trigger. For example, the vehicle can be configured at the factory or by subsequent programming to provide particular vehicle data in response to particular types of triggers. This can be done, for example, using a lookup table in memory where the particular type of trigger is used to determine the particular type of diagnostics to run and vehicle data to be returned. Then, when a trigger occurs, this data is automatically passed to the VDU during the call from the vehicle. Alternatively, the VDU can specify during a particular triggered call from the vehicle exactly what data it wants. In this scenario, the particular customizations of the email notification (e.g., include ABS system diagnostics, but not powertrain) can be used by the VDU to specify to the vehicle what data it wants so that the vehicle need only transmit the desired data.

Figure 7:
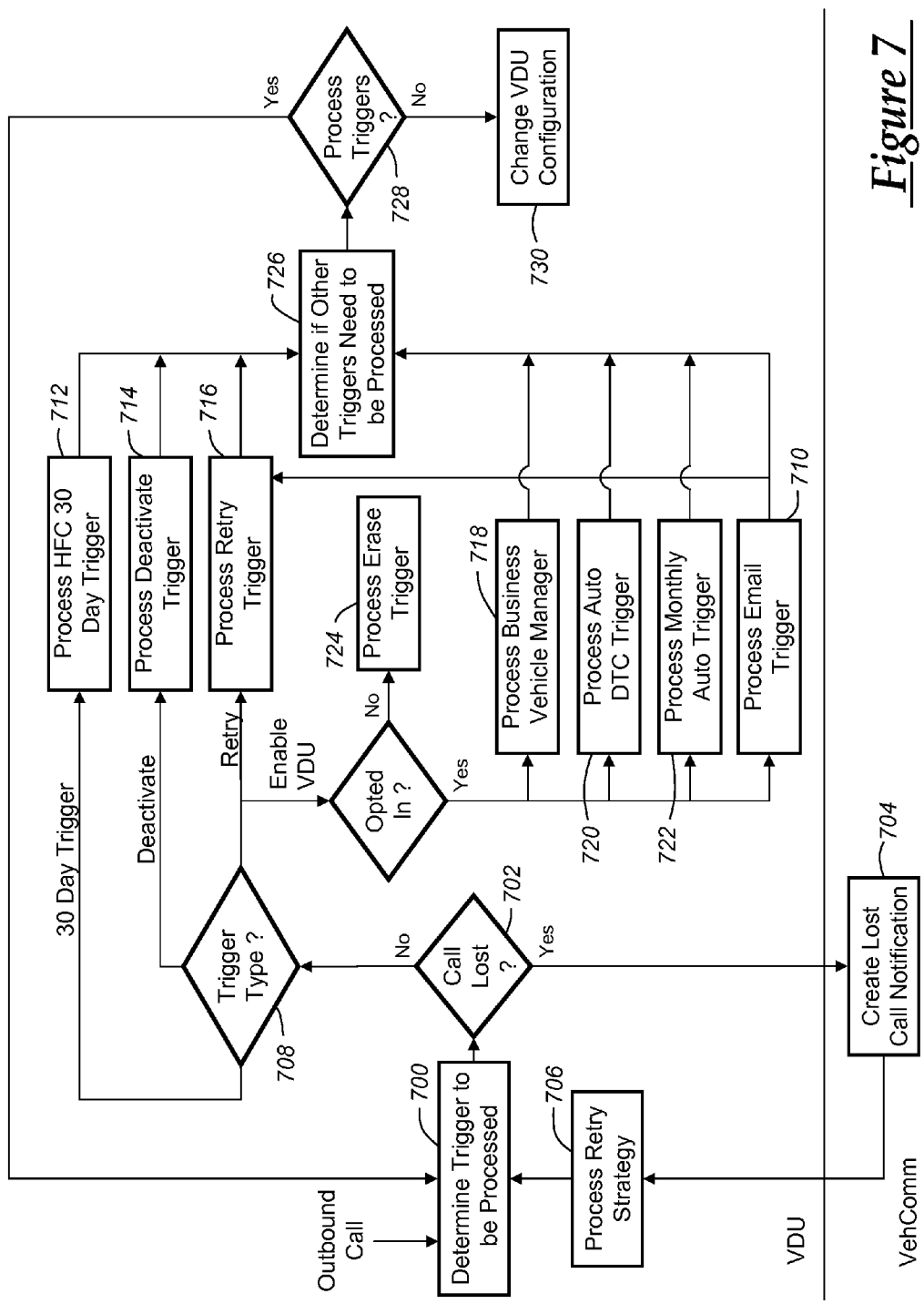
FIG. 7 is a flowchart of the process for VDU handling of triggers within the email notification system of FIG. 1.

Referring now to FIG. 7, there is shown an exemplary process for handling of the triggers by the VDU when a call comes in from the vehicle. The basic function of this routine is to determine what trigger(s) are to be processed (700) and then initiate that processing. The routine includes lost call handling so that, if the call is dropped or otherwise lost before being completed (702), a lost call notification is created (704) and a retry strategy is implemented (706). A lost call can happen, for example, if the vehicle ignition is turned off during the call, or the wireless communication with the vehicle is temporarily lost, or the VDU computer system goes offline, or for other reasons. The retry strategy can involve a set of rules to be followed for lost calls. For example, one retry strategy is for the vehicle to be responsible for re-calling in the event that the call never goes through to the point of being established with the VDU. In this instance the vehicle can retry periodically, e.g., every 10 minutes, or at an appointed time, until the call gets through. However, in this retry strategy, if the call goes through and connects with the VDU, but is then dropped before being complete, then the VDU can be responsible for calling back either periodically or at a certain time. When the call is initially connected between the vehicle and VDU, either the vehicle's VIN or the wireless communication module's STID can be given to the VDU and, if successfully received, this can be used to transfer to the VDU the responsibility of calling back if the call is dropped. When the VDU calls back, the vehicle data that was to be exchanged as a result of the trigger can be sent to the VDU. Alternatively, the call back from the VDU can be simply to set a retry trigger so that, again, the vehicle will thereafter place the call that is used to transmit the desired vehicle information. In either arrangement, the number of retries can be limited to a certain number, following which an error notification can be sent to the subscriber and/or WAS live advisor. This retry strategy is exemplary only, and other retry strategies can be used as desired for a particular application.

There are a variety of trigger types that can be set in the vehicle, some of which are not used to generate email notifications. Thus, as shown in FIG. 7, the process determines what type of trigger has been received (708). Of these, only the "Email Trigger" (710) is used by the VDU to initiate an email notification message via EMGS 184, and that Email Trigger can be one of many different types as discussed above (e.g., a welcome trigger, monthly notification trigger, oil life trigger). Other non-email notification types of triggers shown in FIG. 7 include a hands free calling (HFC) 30 day trigger (712), a deactivate trigger (714), a process retry trigger (716), a business vehicle manager trigger (718), an auto DTC trigger (720), a monthly auto trigger (722), and an erase trigger (724). Some of these triggers are used for other systems and services that are outside of the email notification system. Others can be utilized as part of the notification system, such as the deactivate trigger (714) that can be set if the subscriber ends his or her subscription to the notification system program, in which case this trigger can deactivate the VDU processing for that subscriber's particular vehicle. Similarly, the erase trigger (724) can be used to erase any existing triggers on the vehicle when the subscriber terminates their subscription to the email notification system program.

Once a particular trigger is identified and processed in FIG. 7, the system then checks to see if any additional triggers have occurred that need to be processed (726, 728). If so, the process repeats and, if not, the VDU configuration is updated (730) as the result of the trigger processing (e.g., new triggers set, etc.).

Figure 8:
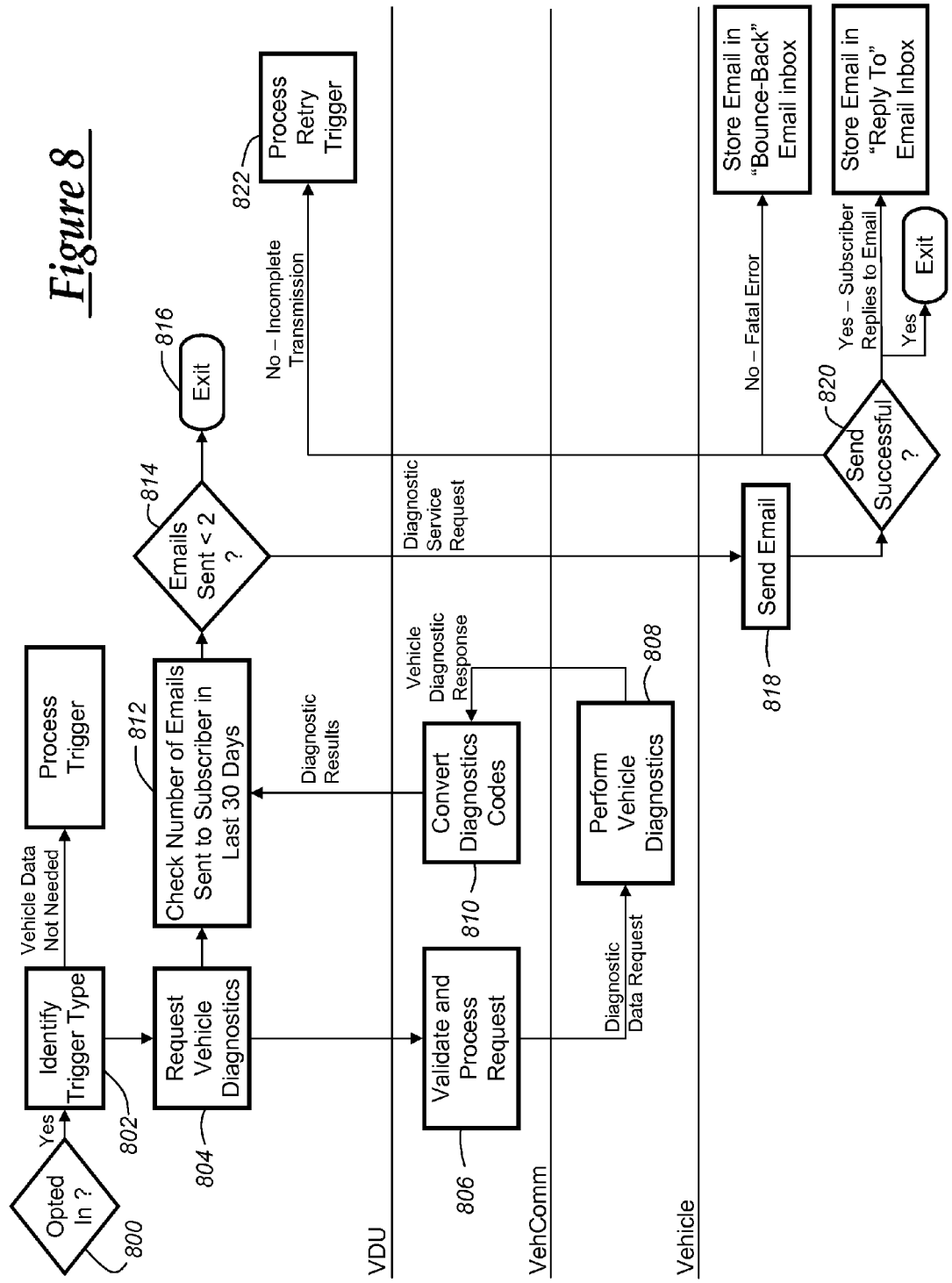
FIG. 8 is a flowchart of notification processing following the trigger processing of FIG. 7.

FIG. 8 is an exemplary flowchart depicting notification processing when an Email Trigger of FIG. 7 is received. As shown in FIG. 8, the processing is distributed over various systems, including the VDU 160, a VehComm system (which is a system that interfaces the VDU to the wireless carrier to send and receive information from the vehicle), the vehicle 110 itself, and the EMGS 184. Assuming the owner is opted into the email notification system program (800), the particular type of email trigger is identified; e.g., welcome, monthly, oil life (802). Then, the VDU requests the needed vehicle data (804) by, for example, requesting that various vehicle diagnostic tests be run. This request is validated and processed by the VehComm (806) which then transmits the diagnostic data request to the vehicle where the diagnostics are performed (808). The vehicle then returns a diagnostic response (including, for example, DTCs), and this diagnostic data is then converted into diagnostic results (810) and passed to the VDU to be supplied to the EMGS for inclusion in the email in the manner discussed above in connection with FIG. 3.

In some cases, it may not be desirable to send the subscriber an email even though a desired trigger has gone off. This may be, for example, because it is not desirable to inundate the subscriber with too many emails from the system. Thus, the system can check the number of emails sent to the subscriber within the last 30 days (812) and, if that number is more than one (814), the system can simply ignore the trigger in the sense that no email is generated (816). If there has not been more than one email recently sent, then the system then instructs the EMGS to build and send the email (818). Failed sent message handling (820) can be built into the system as well, and a retry strategy can be used for this was well, such as resending the email or setting a retry trigger on the vehicle (822) so that, rather than simply resending the email a day or so later, the system can process a new trigger to get the most up-to-date information available from the vehicle. Failed attempts to send the email to the user can be logged and a notice placed on the subscriber center website 190 or MyWAS 188, or sent to the live advisor, or even sent to the vehicle and either noted to the driver via a voice message or displayed on a driver information center if the vehicle is so equipped.

A number of other features can be included in the email notification system. Sometimes, a trigger actually occurs at a time when it is not possible or desirable for the vehicle to call into the VDU. However, the trigger can be time-stamped by the vehicle so that, when the vehicle next calls the VDU, the exact time that the trigger occurred can be given to the VDU. This can also be used to set the system so that calls from the vehicle always occur at a certain time or event (e.g., at vehicle start-up). Apart from the subscriber receiving emails as the result of triggers, the system can allow the user to specifically request an email at any time. As discussed above, this can be by way of a button press of pushbutton 127 on the vehicle (either by requesting an email from a live advisor or by using a voice response unit). Alternatively, the subscriber can request this by sending an email to, for example, the EMGS or WAS. The email can be sent to an address of the form VIN@domain.tld, where the VIN is the vehicle identification number and domain.tld is the domain of the email handling facility. This email message can be used to instruct the VDU to automatically generate an immediate trigger that is sent to the vehicle, executed, and the results returned to the subscriber via the email notification message, so that the subscriber gets a quick vehicle status update. This can be useful, for example, to check the vehicle before leaving on vacation. Preferably, each of the emails sent to the subscriber are also provided to the WAS system so that they are accessible to the live advisor.

Apart from retry strategies that are used when a call is dropped, the VDU can also be programmed to monitor for anticipated triggers from each vehicle so that, for example, if a vehicle is supposed to be calling in on a monthly trigger, but does not, the VDU can call the vehicle to determine its availability and set a new trigger to obtain diagnostic data, etc.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of providing vehicle information to an owner or other recipient, comprising the steps of:
   (a) accessing vehicle data using a telematics unit of the vehicle;
   (b) transmitting the vehicle data from the telematics unit to a central data system;
   (c) selecting a message template that controls the visual appearance of a notification message from among a plurality of message templates;
   (d) constructing the notification message using the selected message template and at least some of the vehicle data; and
   (e) sending the notification message to a recipient via an electronic messaging system.

2. The method set forth in claim 1, wherein step (d) further comprises constructing the notification message so that it contains (1) at least some of the vehicle data represented in language characters, (2) vehicle identification information unique to the vehicle, and (3) a diagnostic result indicating whether some action is required to address one or more of the vehicle conditions.

3. The method set forth in claim 2, wherein step (d) further comprises constructing the notification message as an email message using a markup language.

4. The method set forth in claim 1, further comprising the step of providing a software-implemented administrative tool that permits configuration of one or more message parameters, and wherein steps (d) and/or (e) are carried out in accordance with the message parameter(s).

5. The method set forth in claim 1, wherein step (c) further comprises selecting a message template based on selection criteria.

6. The method set forth in claim 5, wherein step (c) further comprises selecting a message template based on vehicle type.

7. The method set forth in claim 1, further comprising the step of carrying out steps (a) and (b) in response to occurrence of a trigger.

8. The method set forth in claim 7, wherein the trigger is one of a plurality of different types of triggers, and wherein step (c) comprises selecting a message template based on the trigger type.

9. The method set forth in claim 8, wherein step (c) further comprises selecting a message template based on vehicle type, trigger type, and a language preference.

10. The method set forth in claim 1, wherein the message template defines a plurality of different sections that can be used in the notification message, and wherein step (d) further comprises constructing the notification message using only those different sections that are applicable to the vehicle.

11. A method of providing vehicle information to an owner or other recipient, comprising the steps of:
establishing one or more triggers;
monitoring for the occurrence of a trigger and, in response to determining that the trigger has occurred:
providing vehicle data concerning one or more vehicle conditions to an electronic message generating system;
selecting a message template that controls the visual appearance of a notification message using the trigger, a vehicle type, or a language type;
constructing the notification message using the message template along with information concerning the one or more vehicle conditions; and
sending the notification message to the recipient via an electronic messaging system.

12. The method set forth in claim 1, wherein the step of establishing one or more triggers further comprises establishing the trigger(s) in the vehicle by wirelessly transmitting the trigger(s) to the vehicle.

13. The method set forth in claim 12, wherein the step of providing vehicle data further comprises transmitting the vehicle data to a central data system.

14. The method set forth in claim 11, wherein the trigger(s) include a time-based trigger and an oil life trigger, and wherein the step of selecting a message template further comprises selecting a different message template depending upon whether the trigger is the time-based trigger or the oil life trigger.

15. The method set forth in claim 11, wherein the step of selecting a message template further comprises selecting a message template based on vehicle type, trigger type, and a language preference.

16. The method set forth in claim 15, further comprising the step of receiving the language preference from a subscriber.

17. The method set forth in claim 11, further comprising the step of providing a software-implemented administrative tool that permits configuration of one or more message parameters, and wherein the steps of constructing and/or sending the notification message are carried out in accordance with the message parameter(s).

18. The method set forth in claim 11, wherein the message template defines a plurality of different sections that can be used in the notification message, and wherein constructing the notification message further comprises using only those different sections that are applicable to the vehicle.

19. A method of providing vehicle information to an owner or other recipient, comprising the steps of:
(a) providing a software-implemented administrative tool at a central data system;
(b) selecting a template based on a type of vehicle or a type of trigger;
(c) inputting static notification message content via the administrative tool using the selected template;
(d) accessing vehicle data using a telematics unit of the vehicle;
(e) transmitting the vehicle data from the telematics unit to the central data system; and
(f) generating a notification message containing at least some of the vehicle data and static notification message content based on the selected template and sending the notification message to a recipient via an electronic messaging system.

20. The method set forth in claim 19, wherein step (c) further comprises defining at least one message template containing predefined text using the administrative tool.

21. The method set forth in claim 19, wherein step (c) further comprises inputting one or more configurable parameters via the administrative tool.

22. The method set forth in claim 21, wherein step (c) further comprises inputting any one or more of the following configurable parameters:
type of notification message, number and/or timing of resent notification messages following delivery failure of a notification message, and vehicle ignition state required for transmitting vehicle data to the central data system.

23. The method set forth in claim 21, wherein step (e) further comprises transmitting the vehicle data in accordance with the configurable parameter(s).

24. The method set forth in claim 21, wherein step (f) further comprises generating and sending the notification message using at least one configurable parameter.

25. A method of providing vehicle information to an owner or other recipient, comprising the steps of:
(a) accessing vehicle data using a telematics unit of the vehicle;
(b) transmitting the vehicle data from the telematics unit to a central data system;
(c) accessing a message template that defines a plurality of different sections which can be used in constructing a notification message;
(d) constructing the notification message using the message template such that the notification message includes only sections that are applicable to the vehicle; and
(e) sending the notification message to a recipient via an electronic messaging system.

26. The method set forth in claim 25, further comprising the step of receiving from a subscriber an identification of which of a number of particular sections are to be included in the notification message and wherein step (d) further comprises constructing the notification message such that it includes the particular sections identified by the subscriber for inclusion and does not include the particular sections not identified by the subscriber.

27. The method set forth in claim 25, wherein the notification message comprises an email that includes different regions and subsections in at least some of the regions, and wherein the different sections defined by the message template comprise the regions and/or subsections of the email.

28. The method set forth in claim 25, further comprising the step of carrying out steps (a) and (b) in response to occurrence of a trigger.

29. The method set forth in claim 28, wherein the trigger is one of a plurality of different types of triggers, and wherein step (c) comprises selecting a message template based on the trigger type.

30. The method set forth in claim 29, wherein step (c) further comprises selecting a message template based on vehicle type, trigger type, and a language preference.

* * * * *